United States Patent
Fallah-Rad et al.

(10) Patent No.: US 7,441,463 B2
(45) Date of Patent: Oct. 28, 2008

(54) SENSING SYSTEM BASED ON MULTIPLE RESONANT ELECTROMAGNETIC CAVITIES

(75) Inventors: Mehran Fallah-Rad, Winnipeg (CA); Douglas John Thomson, Winnipeg (CA); Gregory Ernest John Bridges, Winnipeg (CA); Lotfollah Shafai, Winnipeg (CA)

(73) Assignee: University of Manitoba, Manitoba (CA)

( * ) Notice: Subject to any disclaimer, the term of this patent is extended or adjusted under 35 U.S.C. 154(b) by 0 days.

(21) Appl. No.: 11/531,174

(22) Filed: Sep. 12, 2006

(65) Prior Publication Data
US 2007/0074580 A1 Apr. 5, 2007

Related U.S. Application Data

(60) Provisional application No. 60/719,584, filed on Sep. 23, 2005.

(51) Int. Cl.
*G01B 7/16* (2006.01)
*G01L 1/00* (2006.01)
(52) U.S. Cl. ...................................................... 73/773
(58) Field of Classification Search ..................... 73/773
See application file for complete search history.

(56) References Cited

U.S. PATENT DOCUMENTS

| | | | |
|---|---|---|---|
| 3,715,686 A * | 2/1973 | Perlman | 331/96 |
| 3,909,713 A | 9/1975 | Billeter | |
| 3,927,369 A * | 12/1975 | Billeter et al. | 324/642 |
| 4,060,762 A * | 11/1977 | McKeown | 324/71.1 |
| 4,196,398 A | 4/1980 | Kuhn | |
| 4,604,898 A | 8/1986 | Gohin et al. | |
| 4,651,571 A | 3/1987 | McGlade | |
| 4,843,346 A | 6/1989 | Heymann et al. | |
| 4,897,541 A | 1/1990 | Phillips | |
| 5,101,103 A | 3/1992 | Johnson et al. | |

(Continued)

FOREIGN PATENT DOCUMENTS

DE        2007447        9/1970

(Continued)

OTHER PUBLICATIONS

Pozar, D.M., Microwave Engineering, John Wiley & Sons, Inc., New York, 1998, pp. 1, 56-69, 87-94, 104-146, 258, 300-323, 332-336.

(Continued)

*Primary Examiner*—Edward Lefkowitz
*Assistant Examiner*—Octavia Davis
(74) *Attorney, Agent, or Firm*—Bereskin & Parr

(57) ABSTRACT

A system and a method for measuring properties and health of structures are disclosed. The system comprises a number of sensors connected to a single antenna. Each sensor has a body that defines an electromagnetic resonator. The electromagnetic resonator produces a response signal in response to an interrogation signal. The body is coupled to the structure to so as to allow the parameters of interest alter the resonance properties of the electromagnetic resonators thereby altering the response signal. The sensor further includes a coupler that is coupled to the body. The coupler transfers the interrogation signal into the electromagnetic resonator and transfers the response signal from the electromagnetic resonator. The system further includes an interrogator that generates and transmits the interrogation signal to the sensor. The interrogator also receives the response signal.

36 Claims, 7 Drawing Sheets

U.S. PATENT DOCUMENTS

| | | | |
|---|---|---|---|
| 5,119,034 | A | 6/1992 | Ishikawa et al. |
| 5,173,640 | A | 12/1992 | Geisler et al. |
| 5,181,423 | A | 1/1993 | Philipps et al. |
| 5,227,798 | A | 7/1993 | Hildebrand |
| 5,261,278 | A | 11/1993 | Kain |
| 5,418,510 | A * | 5/1995 | Gray .......................... 333/208 |
| 5,433,115 | A | 7/1995 | Spillman, Jr. et al. |
| 5,440,300 | A | 8/1995 | Spillman, Jr. |
| 5,495,216 | A * | 2/1996 | Jachowski ................. 333/208 |
| 5,703,576 | A | 12/1997 | Spillman, Jr. et al. |
| 5,764,161 | A | 6/1998 | Schier |
| 5,821,425 | A | 10/1998 | Mariani et al. |
| 5,867,258 | A * | 2/1999 | Frederick et al. ........... 356/35.5 |
| 5,969,260 | A | 10/1999 | Belk et al. |
| 6,025,725 | A * | 2/2000 | Gershenfeld et al. ........ 324/652 |
| 6,354,152 | B1 | 3/2002 | Herlik |
| 6,359,444 | B1 | 3/2002 | Grimes |
| 6,980,688 | B2 | 12/2005 | Wilk |
| 7,034,660 | B2 | 4/2006 | Watters et al. |
| 7,086,593 | B2 | 8/2006 | Woodard et al. |
| 2005/0252300 | A1 | 11/2005 | Miller |

FOREIGN PATENT DOCUMENTS

| | | |
|---|---|---|
| FR | 2700846 | 7/1994 |
| GB | 2212273 | 7/1989 |
| JP | 60203828 | 10/1985 |
| JP | 05264474 | 10/1993 |

OTHER PUBLICATIONS

Stanford Research Systems SC10 High Stability Ovenized 10 MHz Quartz Oscillator Datasheet http://www.srsys.com/html/sc10.html.

Wolf-Eckhard Bulst, Gehard Fischerauer, Leonhard Reindl, "State of the art in Wireless sensing with surface acoustic waves", IEEE Trans. Elec., vol. 48, Iss. 2, 2001, pp. 265-174.

J. Chaung, "Embeddable Wireless Strain Sensor Based on RF Resonant Cavity for Civil Structural Health Monitoring Applications", M.Sc. Thesis, University of Manitoba, 2004.

"Deployment of a fiber Bragg grating-based measurement system in a structural health monitoring application", M. D. Todd, G. A. Johnson and S. T. Vohra, Naval Research Laboratory, Code 5673, Washington, DC 20375, USA, Smart Mater, Struct. 10 (2001) 534-539.

"Conceptual framework of a remote wireless health monitoring system for large civil structures", Darryll J. Pines and Philip A. Lovell, Department of Aerospace Engineering, University of Maryland, College Park, MD, USA in Smart Mater, Struct. 7 (1998) 627-636.

W. R. Fowkes, "Cavity Resonator Measurements at 90 Ghz", ARDB Technical Note 164, pp. 1-6.

McGray-Hill Encyclopedia of Science & Technology, "An international reference work in twenty volumes including an index", 9th Edition, pp. 453-455 and 585-587.

William H. Hayt, Jr., "Engineering Electromagnetics", Fifth Edition, McGraw-Hill, Inc., pp. 416-427.

John D. Kraus, "Electromagnetics", Fourth Edition, McGraw-Hill, Inc., pp. 698-705.

David H. Staelin, et al., "Electromagnetic Waves", Prentice Hall, Upper Saddle River, New Jersey 07458, pp. 336-349, 372-381, 390-401.

http://www.fnrf.science.cmu.ac.th/theory/waveguide/Waveguide%20theory%2014.html.

http://www.tpub.com/neets/book11/44h/htm.

"Tunable laser demodulation of various fiber Bragg grating sensing modalities", R. M. Measures, M. M. Ohn. S. Y. Huang, J. Bigue and N. Y. Fan, Smart Mater. Struct. 7 No. 2 (Apr. 1998) 237-247.

"Structural monitoring by curvature analysis using interfermetric fiber optic sensors", D. Inaudi, S. Vurpillot, N. Casanova and P. Kronenberg, Smart Mater, Struct. 7 No. 2 (Apr. 1998) 199-208.

"Structural health monitoring of innovative bridges in Canada with fiber optic sensors", R. C. Tennyson, A. A. Mufti, S. Rizkalla, G. Tadros and B. Benmokrane, Smart Mater. Struct. 10 No. 3 (Jun. 2001) 560-573.

* cited by examiner

SENSING SYSTEM BASED ON MULTIPLE RESONANT ELECTROMAGNETIC CAVITIES

This application claims the benefit of U.S. Provisional Application No. 60/719,584, filed Sep. 23, 2005, the entire contents of which is hereby incorporated by reference.

The section headings used herein are for organizational purposes only and are not to be construed as limiting the subject matter described in any way.

FIELD

Applicants' teachings are related to a system and method for measuring the properties of materials and structures. More particularly, the applicants' teachings are directed towards a wireless sensing system and method for measuring the properties of materials and structures based on electromagnetic resonance.

INTRODUCTION

In the 1930's the U.S. and Canadian governments began public work programs to develop a transportation infrastructure comprising roadways and bridges. The increased weight and numbers of today's trucks compared with design loads that were used for the roads and bridges at the time of construction, combined with aging, environmental conditions and the use of corrosive salts has resulted in deterioration and increasing structural deficiencies. Currently, the U.S. has 542,000 bridges that consume billions of dollars each year in construction, rehabilitation and maintenance. In Canada, there are an estimated 10,000 railroad bridges and 30,000 automobile bridges with 40% of these bridges requiring repair or replacement. A similar situation is said to exist in Europe and Asia. It can be appreciated that other structures, such as, for example, but not limited to, aircraft, dams and buildings can also suffer from similar structural degradation.

In light of these problems, significant research has been directed over the last few years towards the field of structural health monitoring in order to mitigate potential hazards to the general public and to more effectively manage structures. The research has been directed towards improved methodologies in detecting and monitoring structural degradation with an eye towards improving service life and minimizing down time for maintenance. Ongoing monitoring may be used on these structures to control and predict maintenance and replacement costs and also to increase the lifetime and reliability of these structures. For example, structural information gathered on bridges is important in determining whether or not load ratings should be changed, to catch faults early enough so that repairs may be done, or to find structural problems that require the bridge to be replaced.

The current movement towards structural monitoring involves a detection suite of distributed smart sensors, which can detect potential construction flaws or structural fatigue to expose a potential hazard to the public. Structures having these sensors are referred to as smart structures. Embedded smart structure technology (actuators and sensors) offers the unique ability to assess structures on demand to determine the current condition of the structure. These sensors may also be designed to monitor specific conditions. For example, these devices can provide event-based information such as the condition of structural integrity after a sudden impact from an earthquake, or continuous measurement of data for a range of strain and damage conditions (corrosion).

Two main groups of prior art sensors have been developed for use in smart structures. The first group of prior art sensors comprise sensors that require hardwiring and include traditional strain gauges and fiber-optic strain gauges. The traditional strain gauges are made of metal foil and are bonded to the structure. The strain is determined by measuring the resistance of the metal foil or by determining the mechanical resonant frequency of the metal foil. The foil gauges require a physical connection to transmit the information regarding the structural strain as well as a DC signal for providing power for the strain gauge. Fiber-optic strain gauges were developed to address some of the problems associated with traditional strain gauges. Fiber optic strain gauges are embedded into the structure but require a fiber-optic connection to make a measurement. Systems based on both traditional strain gauges and fiber-optic strain gauges result in a series of connected sensors throughout the structure.

Both traditional strain gauges and fiber-optic strain gauges require a link to the outside world. These technologies for structural health monitoring require some type of permanent connection to the outside world. This causes problems in the installation and ongoing use of these sensors. Several cases have shown that the cost of installation and preparation of site for monitoring equipment can easily equal the cost of sensors and interrogation equipment. Therefore, not all sites will justify the cost of installation and maintenance of a permanent site. Wireless technology could make the monitoring of many more sites feasible and therefore significantly increase the number of structures that could be monitored for safety and operations.

The second group of prior art sensors comprise wireless sensors that do not require a physical connection. Wireless sensors replace a hard-wired or fiber optic link with some form of wireless link. Although one can imagine using ultrasonic or other types of wireless link, it is the electromagnetic wireless link that has proven most useful to date. Within electromagnetic based wireless sensors there are several different classes of sensors:

PASSIVE WIRELESS SENSORS: This type of sensor operates with no internal power source and relies on the power transmitted from the interrogation system in order to carry out a measurement. The broad advantage of this type of system is that the sensor itself requires no source of power and can therefore be embedded within a structure. Examples of this type are Surface Acoustic Wave (SAW) sensors and resonant RF cavity sensors.

POWER ON MEASUREMENT SENSORS: This type of sensor uses traditional sensors such as metal foil strain gauges. Signal conditioning systems within the sensor then convert measurement into a form suitable for transmission via a radio link. The power to run the measurement electronics and the radio communication system are supplied from the interrogation system, typically through coupling coils on the sensor and the interrogator. The advantage of this type is that the sensor does not require any form of power and hence can be embedded or left in the field with no need to provide continuous power. The disadvantage is that this type of sensor requires significant additional electronics, and hence additional cost, for measurement and communications. Examples of this type are the corrosion sensor and chloride sensors.

WIRELESS COMMUNICATION TYPE: This type of sensor uses traditional sensors such as metal foil strain gauges and measurement electronics, but communicates the results via a wireless link. The principle advantage of this type of system is that communications can occur over a relatively long distance. There are many systems of this type, such as, for example, those manufactured by Microstrain Inc. and Xbow Inc. One drawback of this type is that it must contain its own power source. It remains to be seen if battery or power scavenging systems can be developed that will allow these systems to be embedded in structural monitoring systems.

SUMMARY

Applicants' teachings are directed towards a sensor system and method for measuring the properties of materials and structures. The sensors would be installed onto or into a structure such as a bridge, building or the like, to detect the properties of materials, such as moisture, or the strain experienced by the structure. Several sensors can be strategically placed at various locations of the structure that are susceptible to forces or important material changes such as water intrusion. The sensors do not require a source of power and could be activated on demand by a remote interrogator that could be brought within relative proximity of the sensors to activate and record measurements from the sensors.

Each sensor is formed by one or more electromagnetic resonant cavity such as, for example, an electromagnetic cavity having a resonant frequency that is related to the dimensions of the cavity. The dimensions of the cavity are dependant upon the strain experienced by the structure. Accordingly, strain experienced by the structure would be represented by changes in the resonant frequency of the sensor. The interrogator utilizes an interrogation signal having a frequency content that matches the resonant frequency of the electromagnetic cavity. Upon excitation by the interrogation signal, the electromagnetic cavity would produce a response signal that is related to the resonant frequency of the cavity. The interrogator would process the response signal to determine the strain that is experienced by the structure. However, the dimensions of the cavity can also be influenced by other factors such as, for example, but not limited to, temperature. Most metals will expand in dimension as the temperature increases. By using two or more cavities simultaneously it is possible to distinguish between the effects of strain and temperature and therefore more accurately determine the value of multiple parameters. For example, but not limited to, by using two cavities it is possible to measure moisture, while accurately compensating for the effects of temperature.

Fundamentally the system comprises two or more sensors in proximity to the structure to be measured with each sensor having an electromagnetic resonator. Each electromagnetic resonator produces a response signal in response to an interrogation signal. The sensor is coupled to the structure to allow the properties to be measured to alter the resonance properties of the electromagnetic resonator thereby altering the response signal. The sensor further includes a coupler that is coupled to the body. The coupler transfers the interrogation signal into the electromagnetic resonator and transfers the response signal out of the electromagnetic resonator. The system further includes an interrogator that generates and transmits the interrogation signal to the sensor. The interrogator also receives the response signal.

In various embodiments, the applicants' teachings provide sensors for simultaneously measuring several parameters important to evaluating the health and safety of a structure. Each sensor comprises a body having an electromagnetic resonator. The electromagnetic resonator produces a response signal in response to an interrogation signal. The body is coupled to the structure to allow the parameters to be measured to alter the resonance properties of the electromagnetic resonator thereby altering the response signal. The sensor also includes a coupler that is coupled to the body. The coupler transfers the interrogation signal into the electromagnetic resonator and transfers the response signal out of the electromagnetic resonator.

In a further aspect, the applicants' teachings provide for a method and sensor for measuring the properties (parameters) of a structure. The method comprises:

a) coupling at least one sensor to the structure, the at least one sensor having at least one electromagnetic resonator;

b) transferring through at least one coupler an interrogation signal into the electromagnetic resonator to measure a select parameter and to evoke a first response signal associated with the select parameter;

c) transferring through the same or a different coupler the response signal out of the electromagnetic resonator;

d) measuring at least a second select parameter with the interrogation signal and to evoke at least a second response signal associated with the at least second select parameter; and e) transferring through the same or a different coupler the at least second response signal out of the electromagnetic resonator.

The interrogation signal can be swept through a range of frequencies.

In some embodiments, the interrogation signal excites at least two electromagnetic resonances that are substantially separated from one another.

In some embodiments, the at least one sensor is a plurality of sensors coupled to the structure, each of the sensors has an associated coupler coupled to its respective electromagnetic resonator, the associated couplers extend from their respective sensors to a common antenna. Each sensor measures a different select parameter.

In some embodiments, the sensor has a plurality of electromagnetic resonators, each of the electromagnetic resonators has an associated coupler coupled thereto, and the associated couplers extend from their respective electromagnetic resonators to a common antenna. Each electromagnetic measures a different select parameter.

In some embodiments, the electromagnetic resonator of the sensor has at least two rods therewithin, each rod to form within the electromagnetic resonator a resonator system, so that the resonator system associated with a first rod has a resonant frequency substantially separated from the resonant frequency of a second resonator system associated with a second rod. Each resonator system measures a different select parameter.

In some embodiments, the resonant frequency of a select resonant system can be modified by adding material to the select resonant system within the electromagnetic resonator.

In some embodiments, the resonant frequency of a select resonant system can be modified by coupling the select resonant system within the electromagnetic resonator to a separate cavity. The separate cavity can contain an electromagnetic material that responds to a select parameter.

In some embodiments, the electromagnetic resonator is rectangular in shape and configuration having dimensions a, b and c, and at least two couplers are coupled to the electromagnetic resonator. There are two couplers provided for when a is not equal to b. There are three couplers provided for when a is not equal to b and b is not equal to c. The three couplers excite orthogonal electromagnetic modes to one another.

In some embodiments, the electromagnetic resonator is an elliptical cavity in shape and configuration having at least dimensions a, and b, where a is not equal to b, and two couplers are coupled to the electromagnetic resonator.

Applicant's teachings also provide for a sensor for measuring parameters experienced by a structure, the sensor comprising a body having an electromagnetic resonator for producing a response signal in response to an interrogation signal, the body being coupled to the structure to allow a selected parameter to alter the resonance properties of the electromagnetic resonator thereby altering the response signal, and at least two couplers coupled to the sensor, the couplers adapted to transfer the interrogation signal into the electromagnetic resonator to measure separate select parameters, and to transfer the respective response signals of the select parameters measured out of the electromagnetic cavity. The interrogation signal can be swept through a range of frequencies. The electromagnetic resonator can be configured so that the interrogation signal excites at least two electromagnetic resonances substantially separated from one another.

In some embodiments of applicant's teachings a sensor for measuring parameters experienced by a structure, the sensor comprises a body having an electromagnetic resonator for producing a response signal in response to an interrogation signal, the body being coupled to the structure to allow a selected parameter to alter the resonance properties of the electromagnetic resonator thereby altering the response signal, the electromagnetic resonator of the sensor having at least two rods therewithin, each rod to form within the electromagnetic resonator a resonator system, so that the resonator system associated with a first rod has a resonant frequency substantially separated from the resonant frequency of a second resonator system associated with a second rod, and a coupler coupled to the sensor, the coupler adapted to transfer the interrogation signal into the electromagnetic resonator to measure separate select parameters, and to transfer the respective response signals of the select parameters measured out of the electromagnetic cavity. Each resonator system measures a different select parameter.

These and other features of the applicant's teachings are set forth herein.

DRAWINGS

The skilled person in the art will understand that the drawings, described below, are for illustration purposes only. The drawings are not intended to limit the scope of the applicant's teachings in any way.

DESCRIPTION OF VARIOUS EMBODIMENTS

Figure 1:
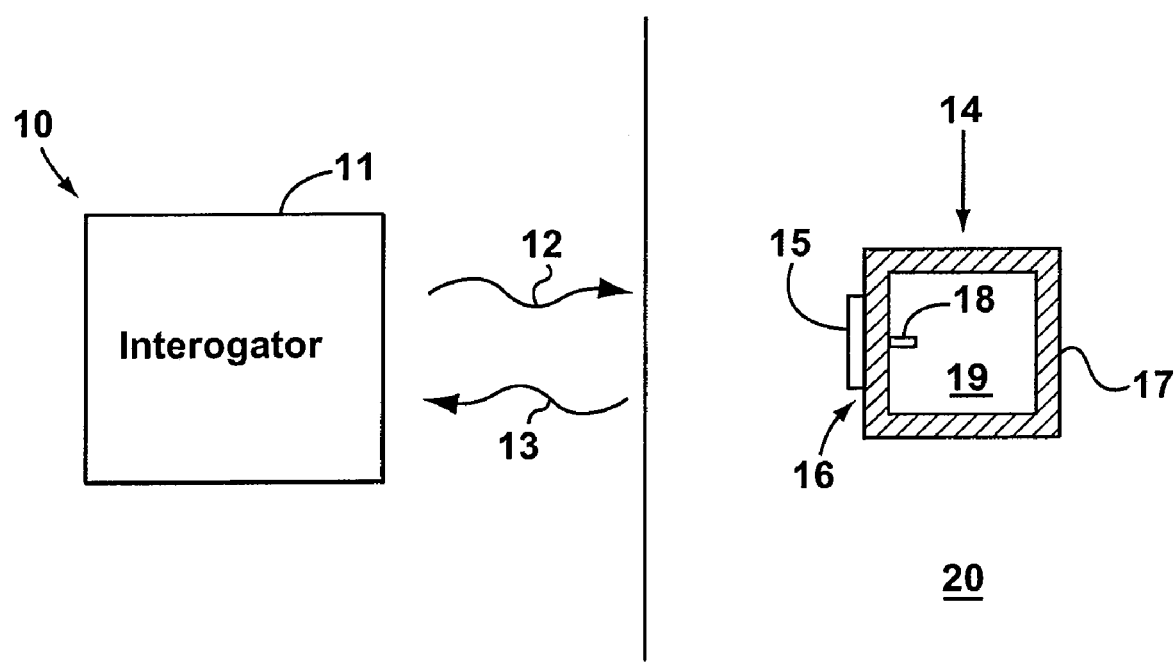
FIG. 1 is a partial, cross-sectional front view of a sensor system comprising an interrogator and a sensor having an electromagnetic cavity for measuring the strain that is experienced by a structure in accordance with the applicants' teachings.

Referring now to FIG. 1, shown therein is a partial cross-sectional front view of a resonant cavity sensing system 10 for determining or measuring parameters 14 experienced by a structure 20. The sensing system 10 comprises an interrogator 11 and a plurality of sensors 17. The structure 20 could be for example, but not limited to, a bridge, a road, an overpass, a building, an aircraft or the like and the parameters 14 can include, but are not limited to, strain, temperature, moisture level, pH or pressure. The integrity of the structure 20 could be monitored at any given time to indicate when repair or replacement is necessary for the structure 20. To achieve this, several sensors 17 would be strategically placed at various locations of the structure 20 that are susceptible to strain (these locations are known to those skilled in the art). For simplicity of illustration and explanation only one sensor 17 and only a partial view of the structure 20 is shown in FIG. 1. The sensors 19 do not require a source of power and could be activated on demand by a remote interrogator 11 as described further below. The interrogator 11 would be brought within relative proximity of each sensor 17 to activate and record measurements from each sensor 17 individually.

The sensor 17 has a body that defines an electromagnetic resonator. For some embodiments, the sensor 17 has a body comprising sidewalls that define an electromagnetic cavity 19 therein. The sensor 17 also includes a coupler 16. The interrogator 11 provides an interrogation signal 12 that is coupled to the electromagnetic cavity 19 via the coupler 16. In response, the electromagnetic cavity 19 produces a response signal 13 that is radiated via the coupler 16. The interrogation signal 12 can be at least partially absorbed by the electromagnetic cavity 19 if the interrogation signal 12 has a frequency content that matches the resonant frequency of the electromagnetic cavity 19. In this case, there will less energy at the resonant frequency of the electromagnetic cavity 19 that is reflected by the electromagnetic cavity 19 while the interrogation signal 12 is being transmitted. Accordingly, the response signal 13 will have a small signal component at the resonant frequency of the electromagnetic cavity 19. Alternatively, if the interrogation signal 12 frequency content does not match the resonant frequency of the electromagnetic cavity 19 most of the interrogation signal 12 will be reflected by the electromagnetic cavity 19 and the response signal 13 will comprise most of the interrogation signal 12. In this fashion, it is possible to determine the resonant frequency of the electromagnetic cavity 19. This is important since the resonant frequency of the electromagnetic cavity 19 will vary depending on the geometrical dimensions and electromagnetic properties of the electromagnetic cavity 19, which, in turn, depends on the parameter 14 coupled to the resonant cavity 19 experienced by the structure 20. Hence, the change in the resonant frequency of the electromagnetic cavity 19 provides an indication of the parameter 14 experienced by the structure 20.

The sensor 17 can be made of a non-corrosive metal so that the sensor 17 remains functional for the lifetime of the structure 20. For example, but not limited to, the sensor 17 can be made from stainless steel. The sensor 17 is a relatively small object so that it does not compromise the structural integrity of the structure 20 when the sensor 17 is coupled with the structure 20. For example, but not limited to, the sensor 17 can be a rectangular, hollow metal block having dimensions of 90 mm×90 mm×30 mm.

The electromagnetic cavity 19 is enclosed by conducting walls that are capable of containing oscillating electromagnetic fields that can lead to electromagnetic resonance. Accordingly, when electromagnetic energy is transferred to the electromagnetic cavity 19, the electromagnetic energy will oscillate between the conductive walls transforming between an electric field and a magnetic field and become more intensified in a resonating fashion depending on the frequency of the transferred electromagnetic energy. Accordingly, the electromagnetic cavity 19 possesses resonant properties within narrow frequency bands centered about discrete frequencies called resonances or resonant frequencies. Resonance will occur when the frequency of the transferred electromagnetic energy has a frequency content that matches the resonant frequency of the electromagnetic cavity 19. An analogy can be drawn to a guitar string where it will resonate at a frequency determined by the length of the string and the mechanical properties of the string. Using this analogy the dimensions of the cavity can be thought of to be the length of the string and the mechanical properties of the string can be thought of as the electromagnetic properties of the cavity such as the dielectric constant.

Any completely enclosed conductive surface, regardless of its shape, can act as an electromagnetic cavity resonator. This allows a cavity resonator to be built for different applications and have a resonant frequency in different frequency ranges. Accordingly, the electromagnetic cavity 19 can also have a variety of shapes such as cubic, rectangular and cylindrical. Other shapes can also be useful. The choice of a particular shape for the electromagnetic cavity 19 can depend on the parameter 14 that is to be measured, as well as the frequency range of operation.

Figure 2:
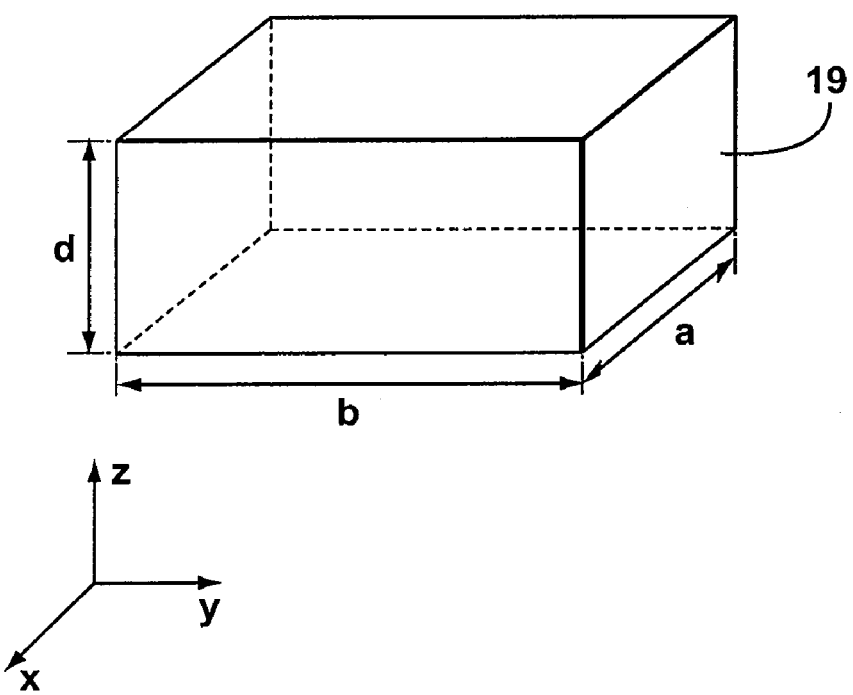
FIG. 2 is a schematic representation of a resonant cavity.

Referring now to FIG. 2, an example of an electromagnetic cavity 19 for use with the sensor 17 is illustrated. For some embodiments, the electromagnetic cavity 19 resembles a section of a square waveguide that is closed at both ends by conducting plates. Since the tangential electric field must be zero at the walls of the cavity 19 only certain distinct frequencies determined by the dimensions of cavity 19 will become resonant. Therefore, the physical size of the electromagnetic cavity 19 affects the resonant frequency. In general, the smaller the electromagnetic cavity, the higher the resonant frequency. However, another controlling factor of the resonant frequency is the shape of the electromagnetic cavity 19 and the mode of the electromagnetic fields that exist within the electromagnetic cavity 19.

The resonant frequency of the electromagnetic cavity 19 can be changed by changing the dimensions of the electromagnetic cavity 19, which is known as shape tuning. This will occur when there is a change in the parameter 14 to be measured that induces a change in the dimensions of the cavity.

For a rectangular electromagnetic cavity 19, such as the one shown in FIG. 2, having dimensions in the x, y and z direction represented by a, b and d, the electromagnetic cavity 19 can support $TE_{mnp}$ and $TM_{mnp}$ modes, where TE stands for transverse electric wave, TM stands for transverse magnetic wave and m, n, and p are integers indicating the mode of the enclosed fields. Both the $TE_{mnp}$ and $TM_{mnp}$ modes resonate at the frequency $f_{mnp}$ given by:

$$f_{mnp} = \frac{c}{2}\sqrt{\left(\frac{m}{a}\right)^2 + \left(\frac{n}{b}\right)^2 + \left(\frac{p}{d}\right)^2} \qquad (1)$$

where c is the speed of light in the cavity ($3 \times 10^8$ m/sec in air).

Assuming that TE or TM modes are excited with respect to the z direction and d is small (i.e. p=0) and only the first mode is excited with respect to the x and y directions (i.e., m=n=1) then the resonant frequency ($f_r$) is given by equation 2.

$$f_r = \frac{c}{2}\sqrt{\left(\frac{1}{a}\right)^2 + \left(\frac{1}{b}\right)^2} \qquad (2)$$

Now letting a=b=h and assuming a change in the y direction of Δh, the resonant frequency is given by equation 3.

$$f_r = \frac{c}{2}\sqrt{\left(\frac{1}{h}\right)^2 + \left(\frac{1}{\Delta h + h}\right)^2} \qquad (3)$$

Furthermore, if Δh<<h, the resonant frequency is closely approximated by equation 4.

$$f_r = \frac{c}{\sqrt{2}\, h}\sqrt{1 - \frac{\Delta h}{2h}} \qquad (4)$$

The resonant frequency ($f_u$) of the cavity 19 before the parameter of interest causes a change is given:

$$f_u = \frac{c}{\sqrt{2}\, h} \qquad (5)$$

If for example the cavity was strained the resonant frequency ($f_s$) would be given by:

$$f_s = f_u\left(1 - \frac{1}{\sqrt{2}}E\right) \qquad (6)$$

where E=Δh/h is defined as strain. Accordingly, the strain E, can be calculated from the resonant frequencies $f_u$ and $f_s$ according to:

$$E = \frac{\sqrt{2}\,(f_u - f_s)}{f_u} \tag{7}$$

The strained resonant frequency $f_s$ can be larger or smaller than the unstrained resonant frequency $f_u$. This depends if the strain 14 is positive or negative.

By selecting a higher frequency range for the interrogation signal, the sensor system 10 is able to make precise measurements of small amounts of strain. For instance, given values of $f_u$=3.6 GHz and $f_s$=3.599995 GHz, i.e., a change in resonant frequency of 2.5 KHz, the strain would be:

$$E = \frac{\sqrt{2}\,(3.6 - 3.5999975)}{3.6} \approx 1 \text{ microstrain} \tag{8}$$

Therefore, operating at 3.6 GHz, results in a shift in resonance of 2.5 KHz for every change in strain of 1 microstrain. Accordingly, the sensor system 10 will be able to make precise measurements of small amounts of strain, even in parts per million.

A strain of 0.1%, for example, would result in a frequency change of 2.5 MHz. Accordingly, to measure such a strain, the sensor system 10 would need a bandwidth of at least 2.5 MHz. Since the regulatory commissions would dictate the frequency that could be used for the sensor system 10, some possible frequency ranges that can be used would be centered at 900 MHz, 2.5 GHz and 5.8 GHz. The frequency range at 2.5 GHz can be used since it would have a bandwidth from 2.4 to 2.6 GHz (200 MHz), which is more than adequate for sensing the 0.1% strain mentioned above.

As mentioned previously, the coupler 16 transfers or injects the interrogation signal 12 into the electromagnetic cavity 19 and the coupler 16 also transfers or radiates the response signal 13 to the interrogator 11. Energy can be inserted or removed from an electromagnetic cavity 19 by the same methods that are used to couple energy into and out of waveguides. The operating principles of probes (electric coupling), loops (magnetic coupling), and slots are the same whether used in an electromagnetic cavity or a waveguide as is commonly known in the art. Therefore, any one of these three methods can be used to transfer energy into or out of the electromagnetic cavity 19. If a slot were used for the coupler 16, the degree of coupling would be determined by the size, shape and position of the slot. This example is only meant to be illustrative and there are many types of couplers including, wires, loops and slots.

In various embodiments, there can be two couplers connected with the sensor 17. The first coupler can be used to inject electromagnetic energy into the electromagnetic cavity 19 and the second coupler can be used to transmit electromagnetic energy from the electromagnetic cavity 19.

A method of transferring or injecting energy into the electromagnetic cavity 19 is by exciting the magnetic field in the electromagnetic cavity 19. This can be accomplished by incorporating a small loop to ground near the end of a wire 18 that is coupled to an antenna 15. Wire 18 carries current into the electromagnetic cavity 19. If the frequency of the current in the loop is within the resonant bandwidth of the electromagnetic cavity 19 then energy will be transferred to the electromagnetic cavity 19. For efficient coupling to the electromagnetic cavity 19, the loop should be placed at a location of maximum magnetic field intensity, which depends on the mode of the electromagnetic field contained in the electromagnetic cavity 19. When less efficient coupling is desired, the loop can be moved or rotated or the diameter of the loop changed within the electromagnetic cavity 19. Removal of energy from the electromagnetic cavity 19 is a reversal of the injection process using the same loop and wire 18.

The electromagnetic cavity 19 has advantageous properties when it is designed to have a resonant frequency in the RF range. With a resonant frequency in the RF range it should be possible to measure strains on the order of 1 μE and other material properties such as temperature and moisture content with very high resolution and repeatability. In addition, with an electromagnetic cavity 19, different resonant frequencies result in the excitation of different modes of the electromagnetic field within the electromagnetic cavity 19 which can make the sensor 17 sensitive to strains in different directions, as will be discussed below.

Another advantageous property of an electromagnetic cavity is a high Q factor. The Q factor is a measure of the resonant frequency relative to the resonance bandwidth:

$$Q = \frac{f_0}{\Delta f} \tag{9}$$

where $f_o$ is the resonant frequency and $\Delta f$ is the resonance bandwidth. The Q factor of an electromagnetic cavity also represents the amount of stored energy compared with the energy lost due to the imperfectly conducting walls, the imperfect dielectric within the electromagnetic cavity (if present) and the coupling to the outside world, as represented by equations 10 and 11.

$$Q = \frac{2\pi f_0 \cdot (\text{energy stored})}{\text{average power loss}} \tag{10}$$

$$Q = \frac{\pi \cdot (\text{energy stored})}{\text{energy loss per half cycle}} \tag{11}$$

In general, electromagnetic cavities can be designed to have a Q factor in excess of 2,000. A high Q factor allows for an accurate determination of the resonant frequency of the electromagnetic cavity 19. If the cavity has been designed so that the parameter of interest has significant effect on the resonant frequency then a high Q will also allow for the accurate determination of the parameter of interest.

Figure 3:
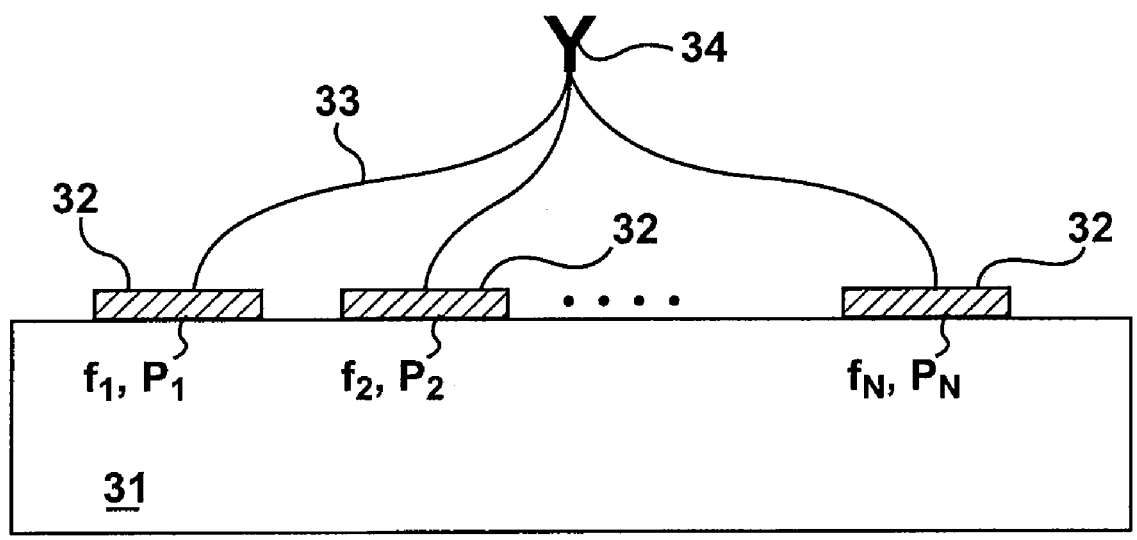
FIG. 3 is a schematic view of some embodiments where a single antenna is used to interrogate multiple sensors.

Previous RF cavity sensors assumed that only one parameter was measured by each sensor, and each sensor was provided with an attached antenna. However, various embodiments are possible where two or more parameters can be measured with only a single antenna being required for the transmission and receiving of the RF signals. The general case of these various embodiments is seen in FIG. 3. Here a single antenna 34 is coupled via 33 to a number of resonant cavity sensors 32. A number of sensors 32 can be interrogated through a single antenna 34 providing that the sensors each have a resonant frequency, $f_1, f_2, \ldots, f_N$, that is easily distinguishable from the other sensors that are coupled to the same antenna. These sensors are designed to measure parameters, $P_1, P_2, \ldots P_N$, important to evaluating the safety and for the prudent management of the structure 31.

In some embodiments, each sensor 32 is capable of measuring parameters independently without influence from the other sensors. The advantage of such a configuration is that through a single antenna 34 multiple parameters can be measured reducing the cost of sensing systems. A second advantage of this approach is that if two of the sensors 32 are in close proximity one sensor 32 can be used to correct the other to result in measurements of significantly higher accuracy. For example, if one sensor 32 measures strain and one temperature, then the strain sensor 32 could be corrected for the effects of temperature.

Figure 4:
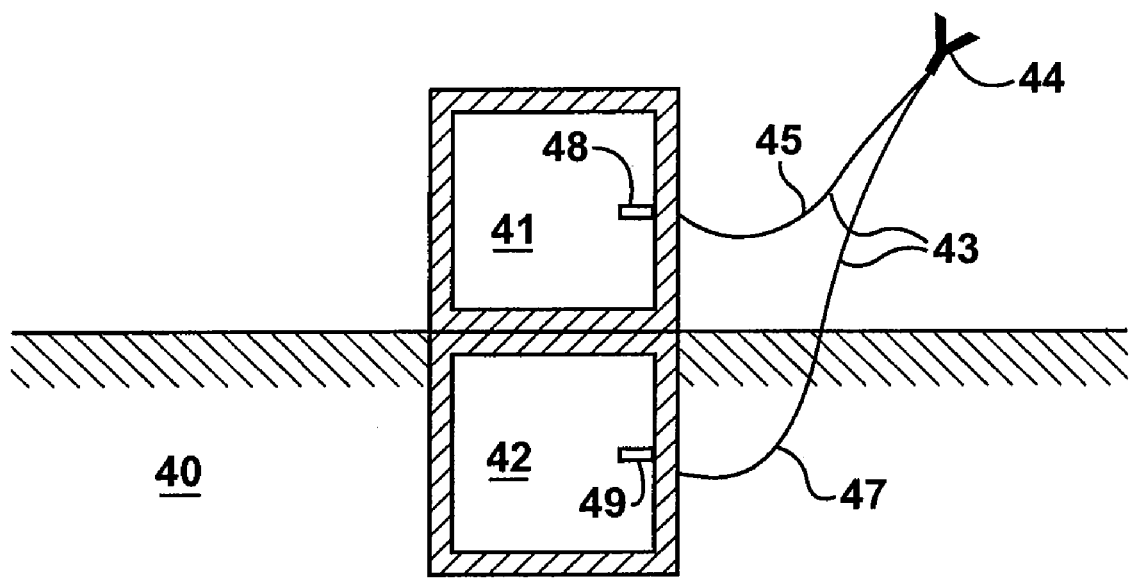
FIG. 4 is a schematic view of some embodiments where one sensor is mechanically coupled to the structure to measure strain and a second is not mechanically coupled and is used to correct for environmental effects.

Some embodiments for correcting effects due to the local environment are shown in FIG. 4. In this Figure one sensor 42 is embedded in the structure 40 and the second sensor 41 is exposed to the environment. The two sensors can be coupled by coupling element 43 to a single antenna 44. The signal from the antenna 44 will be split between the two sensors 41, 42 through couplers 43, 45. Therefore the electromagnetic signal will simultaneously be coupled to both sensors 41, 42. However, only when the frequency of the electromagnetic signal matches the resonant frequency of one of the sensors will the energy be absorbed selectively by one of the sensors, with little of the signal being absorbed by the other sensor. When the signal is turned off this sensor will then re-emit this energy as described previously. For example, this might be useful in corrosion applications where the embedded sensor would measure the effects of corrosion, but would be corrected for environmental effects as measured by the second sensor 41. Corrosion could be sensed by making the outer shell of the sensor 42 out of a material such as iron, which expands in volume when it corrodes. When the outer shell of the sensor corrodes this would then exert a pressure on the cavity causing it to shrink. This in turn would cause the resonant frequency to shift as outlined above.

Figure 5:
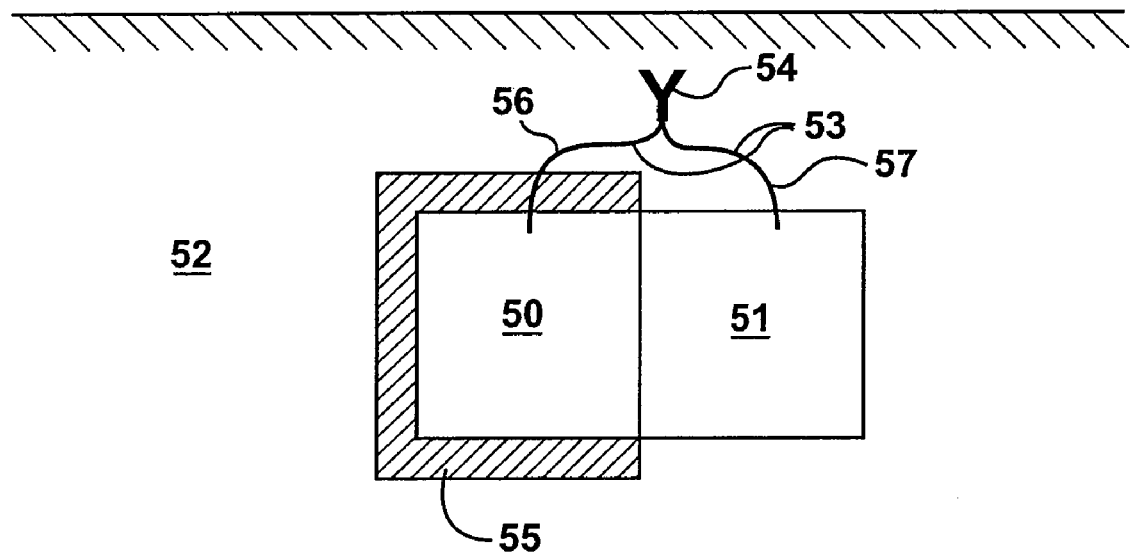
FIG. 5 is a schematic view of some embodiments of two embedded sensors, where one sensor is mechanically coupled to the structure to measure strain and a second is not mechanically coupled and is used to correct for environmental effects.

Various embodiments of applicants' teachings are shown in FIG. 5 where two sensors are both embedded within a structure. The first sensor 50 is decoupled from the structure 52 by a barrier 55. In the case of a strain sensor this barrier can be, for example, but not limited to, a layer of foam, which acts to mechanically decouple the sensor from the structure. The second sensor 51 is coupled to the structure 52. By interrogating the sensors through one antenna 54 and coupler 53, with associated coupler leads 56, 57, each sensor can be interrogated, so long as the resonant frequency of sensor 51 is sufficiently separated from the resonant frequency of sensor 50. Sufficiently separated means that each resonant peak is easily identifiable and does not significantly overlap with other resonant peaks. For example, if the peaks were separated by more than $f_r/Q$ they would be sufficiently separated for some interrogation techniques. This configuration could be particularly useful for measuring strain with sensor 51 and correcting for the effects of temperature with sensor 50.

Figure 6:
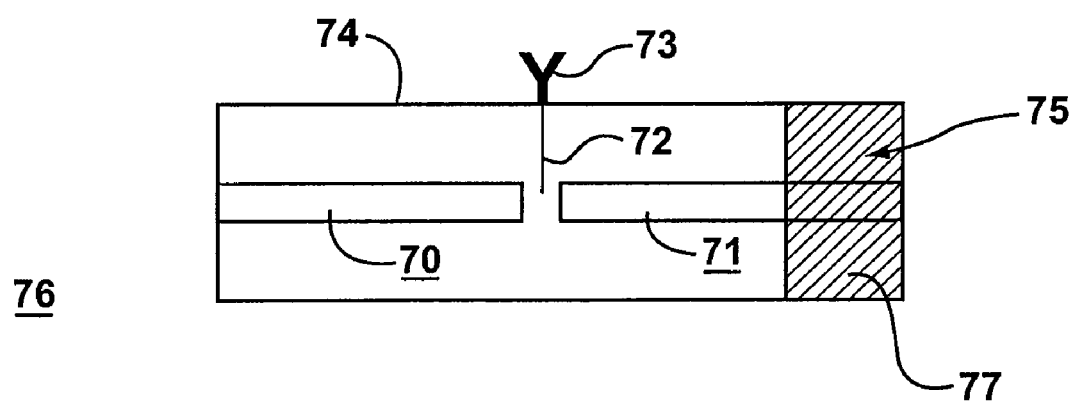
FIG. 6 is a cross-sectional view of a sensor where two resonant sensing cavities are formed by cutting a conductor into two parts.

Various embodiments of a sensor according to applicants' teachings is shown in FIG. 6. Here the two resonant cavity sensors and share the same cavity 74 and are coupled to a structure 76. An antenna 73 couples an electromagnetic signal to coupler 72. This coupler 72 then splits the electromagnetic signal between two rods 70 and 71. Rods 70, 71 each form a resonant system. The resonant mode most commonly used will be a maximum near the coupler and drop to zero where the rod contacts the body of the cavity 74. If the cavity is empty then the resonant frequency will be at a frequency where the free space wavelength of electromagnetic waves will be equal to 4 times the length of the rod. In other words resonance will occur when the rod is ¼ of a wavelength long. If a suitable material 77 is added to the cavity 75 at one end, as shown in FIG. 6, then the resonant frequency will be shifted due to the electromagnetic effects of the material. If the material has the effect to slow down electromagnetic waves the rod will look as if it is electromagnetically longer and hence the resonant frequency will shift down. If the electromagnetic properties of the material change with a parameter of interest, then the resonant frequency of the cavity can be used to measure the parameter of interest. For example, a number of polymers are known to change electromagnetic properties in response to changes in humidity and pH. Therefore with some embodiments it would be possible to construct sensors for humidity and pH in addition to temperature and strain.

Figure 6B:
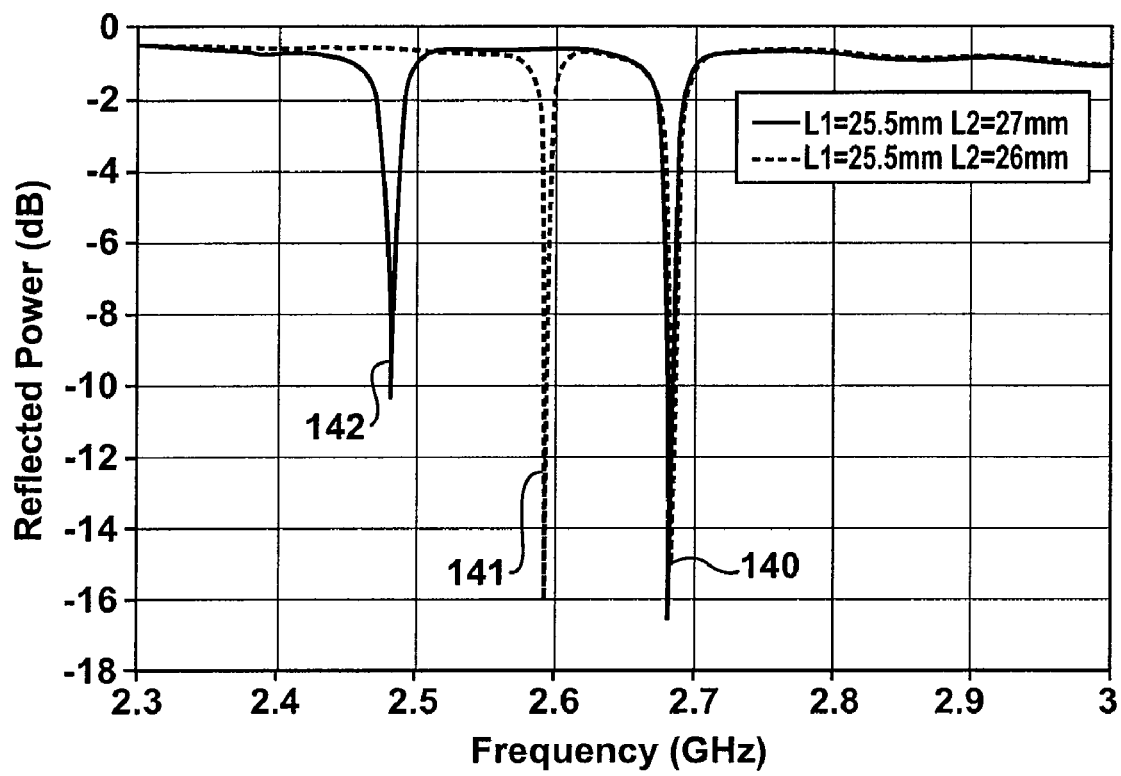
FIG. 6b shows frequency the response of a cavity where one resonant mode is changed without affecting the second resonance.

Results from a sensor of the type shown in FIG. 6, are seen in FIG. 6b. Here a cavity of the type described in FIG. 6 has been designed with two adjustable rods. The length of the rods can be adjusted independently. In the example shown one of the rods is changed in length while the other remains fixed. The fixed length rod 70 results in the resonant peak 140 at approximately 2.67 GHz. The variable length rod yields a resonant peak 141 at approximately 2.59 GHz for a length of 26 mm and a resonant peak 142 at approximately 2.47 GHz for a length of 27 mm. Clearly as the resonance from the variable length rod changes from position 141 to position 142 the resonance due to the fixed length rod 140 remains essentially unchanged. This example clearly demonstrates how a parameter of interest can influence one resonant peak while a second resonant cavity coupled to the same antenna and coupler remains unaffected. In this example the first resonance 140 could be used for calibration while the variable peaks 141, 142 could be used to measure a parameter of interest.

Figure 7:
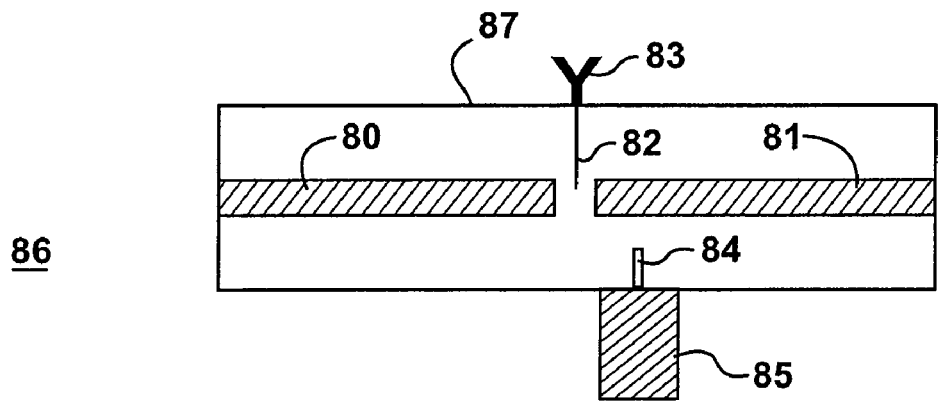
FIG. 7 is a cross-sectional view of a two resonator sensor where one of the resonators is coupled to an external cavity containing a dielectric that responds to the parameter of interest.

For various embodiments of applicants' teachings, as illustrated in FIG. 7 where a sensor is coupled to structure 86, an electromagnetic signal is received by an antenna 83 and coupled to rods 80 and rod 81 within the cavity 87 through coupler 82. As previously described in relation to FIG. 6, the rods will reach resonance at a number of frequencies including the ¼ wavelength frequency. In some embodiments one of the rods 81 has a second coupler 84 that couples the electromagnetic signal on rod 81 to a second cavity 85. This cavity 85 contains an electromagnetic material that responds to the parameter of interest. For example, but not limited to, it could be a polymer that changes dielectric constant with moisture content. Through this coupling of rod 81 to a second cavity 85 the resonance of rod 81 could be shifted by the effect of the parameter of interest on the material in cavity 85. The advantage of this approach is that the magnitude of the coupling between external cavity 85 and the resonance on rod 81 can be controlled by the coupler 84. Hence electromagnetic materials with very large responses can be used and the resonance can be shift can be kept within regulatory bounds.

The rods in this embodiment can also be formed of dielectrics or spiral conductors. Embodiments with dielectric rods have the advantage of potentially lower electromagnetic losses and hence increased Q. Use of a rod formed from a spiral conductor has the advantage of smaller size as a spiral conducting rods can reach the resonant condition at much shorter rod lengths.

Figure 8:
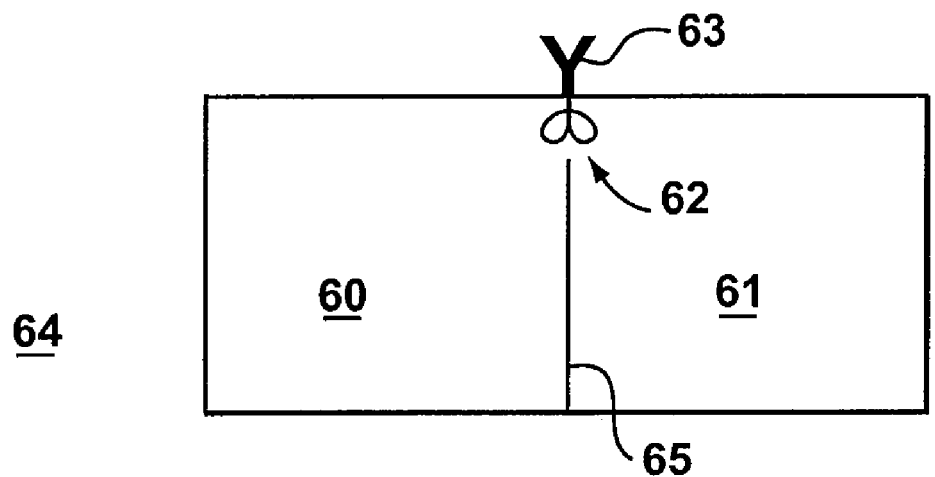
FIG. 8 is a cross-sectional view of a sensor where two resonant cavities are formed by the introduction of a conducting wall and the cavities are simultaneously excited.

Various embodiments of applicants' teachings can be seen in FIG. 8, where the sensor is coupled to structure 64. In some embodiments the electromagnetic signal is received by antenna 63 and is coupled to two cavities 60 and 61 separated by a barrier 65. Barrier 65 can be metallic or dielectric. In some embodiments the cavities 60, 61 are hollow and the coupler 62 can be loops that couple to both cavities 60, 61. In some embodiments the resonance of the cavities 60, 61 can be effected by changes to the dimensions of the cavity, by pressure for example, or by the introduction of electromagnetically active materials that respond to the parameter of interest. Hollow cavities have the advantage that they can in general achieve higher Q and hence better sensitivity. In some cases they can also be easier to fabricate than cavities with several internal conducting parts.

Figure 9:
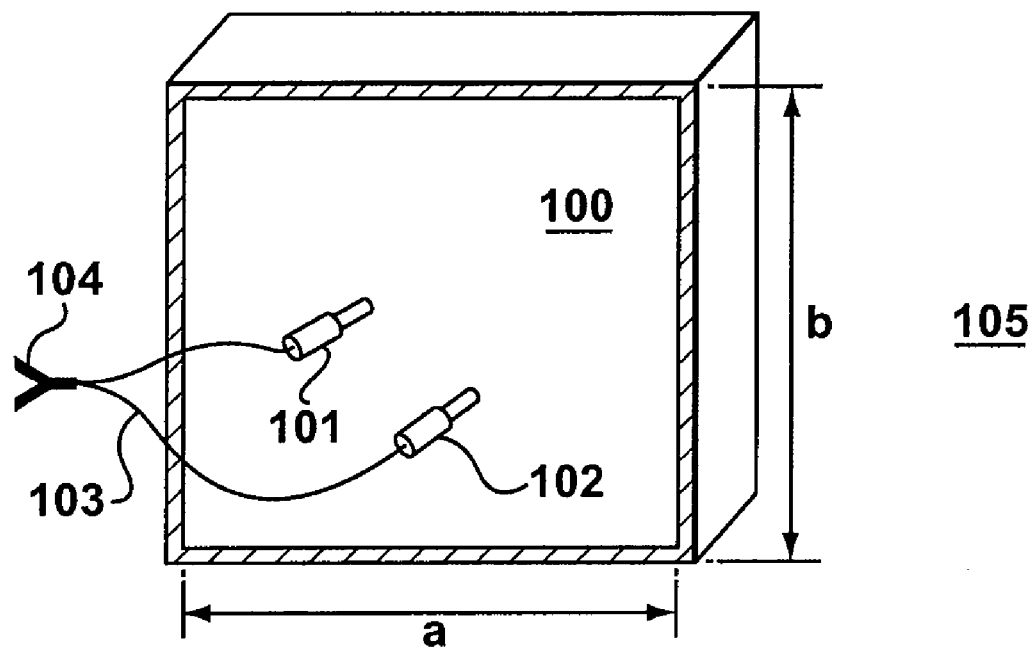
FIG. 9 is a view of a rectangular cavity sensor where two electromagnetic modes are formed by the asymmetrical shape, but where the parameters effect can be largely made to couple only to one mode.

Various embodiments of applicants' teachings as shown in FIG. 9 outlines an approach where multiple electromagnetic modes within the same cavity can be used to measure multiple parameters. The sensor is coupled to structure 105. In a rectangular cavity 100, as outlined above having regard to FIG. 2, multiple resonances are possible. For a rectangular cavity the modes can be estimated using the following:

$$f_{mnp} = \frac{c}{2}\sqrt{\left(\frac{m}{a}\right)^2 + \left(\frac{n}{b}\right)^2 + \left(\frac{p}{d}\right)^2} \quad (1)$$

Here m,n,p are integers that specify a particular mode. Let us assume h is small (i.e. p is 0). Then we would have a cavity where the resonant frequencies only depend on the dimensions a,b and the mode number n,m. If we choose a mode where a and b are slightly different from each other and we also choose n to be 1 and m to be 2 then we would have a mode with a null along the x direction at position a/2 and a maximum at b/2 along the y direction. We could excite this mode by choosing the position of the coupler lead 101. Since a null occurs at position a/2 for this mode it will not be coupled to coupler lead 102. We could excite a mode in the other axis (n=2 and m=1) by choosing the position of the second coupler lead 102. However, since a is not equal to b these resonances will not be at the same frequency. The separation between these frequencies can be controlled by the choice of a and b along with the mode numbers m and n. With the correct choices two distinct resonant modes could be excited, where one would be excited through the antenna 104 and coupler 103 and coupler lead 101. A second mode would be excited in the same way through coupler lead 102. However, changes in dimension a and dimension b could now be independently measured. The advantage of this approach is that the sensor construction is simple and requires a minimum of internal conducting parts.

Figure 10:
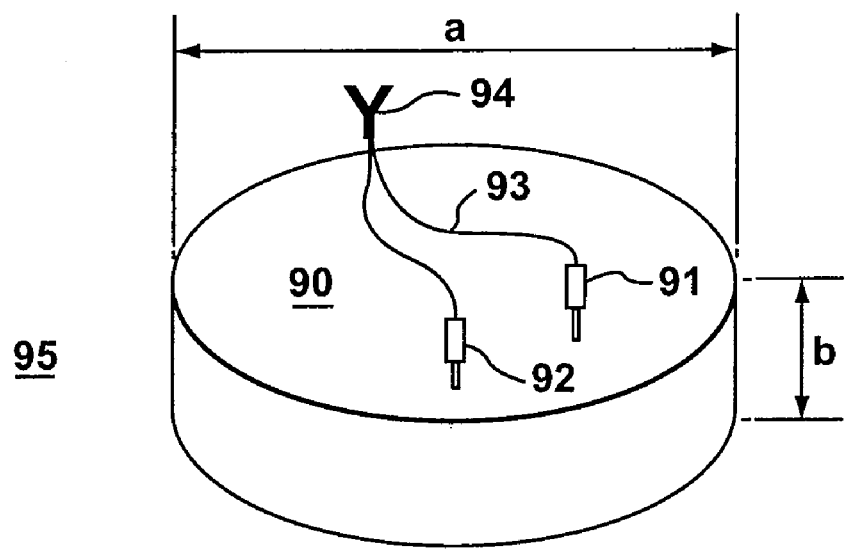
FIG. 10 is a view of an elliptical cavity sensor where two electromagnetic modes are formed by the asymmetrical shape, but where the parameters effect can be largely made to couple only to one mode.

Various embodiments of applicants' teachings are shown in FIG. 10 where the sensor is coupled to a structure 95. Again, an electromagnetic signal is received at an antenna 94 and coupled through coupler 93 to two coupler leads 91 and 92. As above these probes can excite modes in an elliptical cavity that are at different frequencies. As in the example above, these resonances can be independently measured. Thus dimensional and other changes can be measured allowing multiple parameters to be measured through a single antenna.

Figure 11:
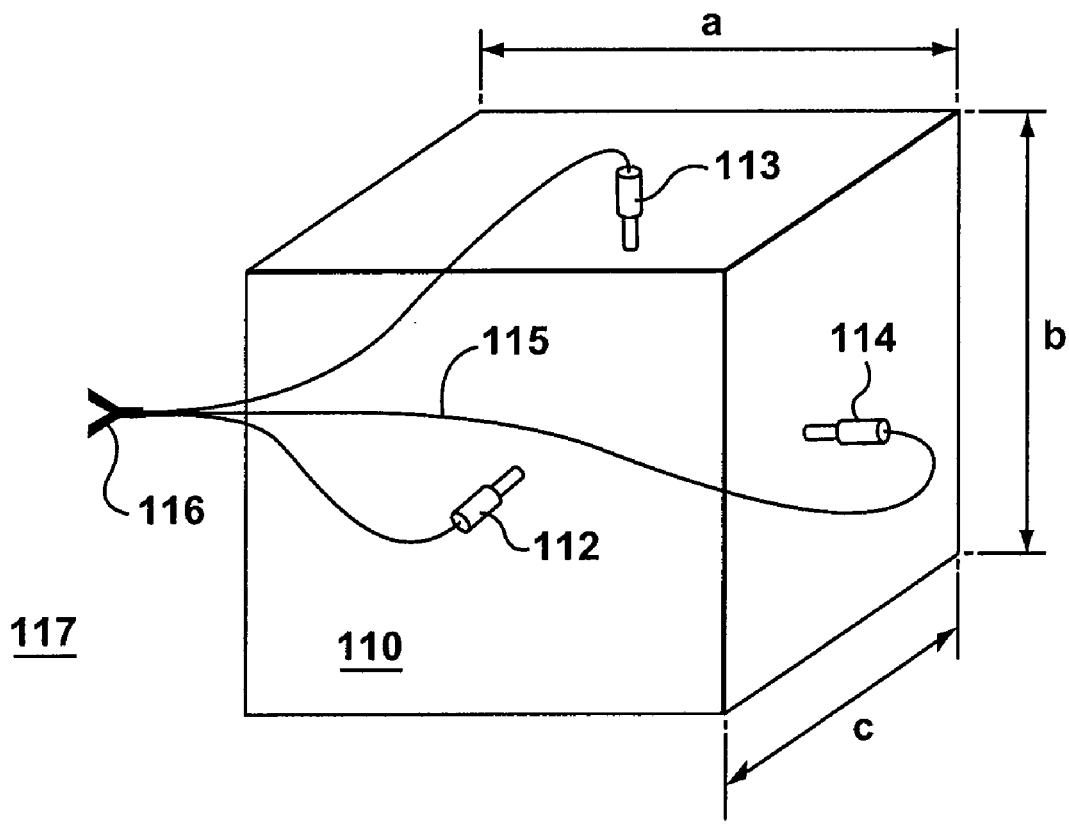
FIG. 11 is a view of a rectangular cavity sensor where three electromagnetic modes are formed by the asymmetrical shape, but where the parameters effect can be largely made to couple only to one mode.

This approach can also be extended to 3 dimensions where the sensor is coupled to structure 117. In some embodiments 3-dimensional measurements can be made by the application of the principles outlined above. FIG. 11 shows some embodiments of applicants' teachings where a single antenna 116 excites 3 orthogonal modes through coupler 115 to coupler leads 112, 113, 114 coupling to a cavity 110. As illustrated, changes in dimension a, dimension b, and dimension c can be independently measured.

Figure 12:
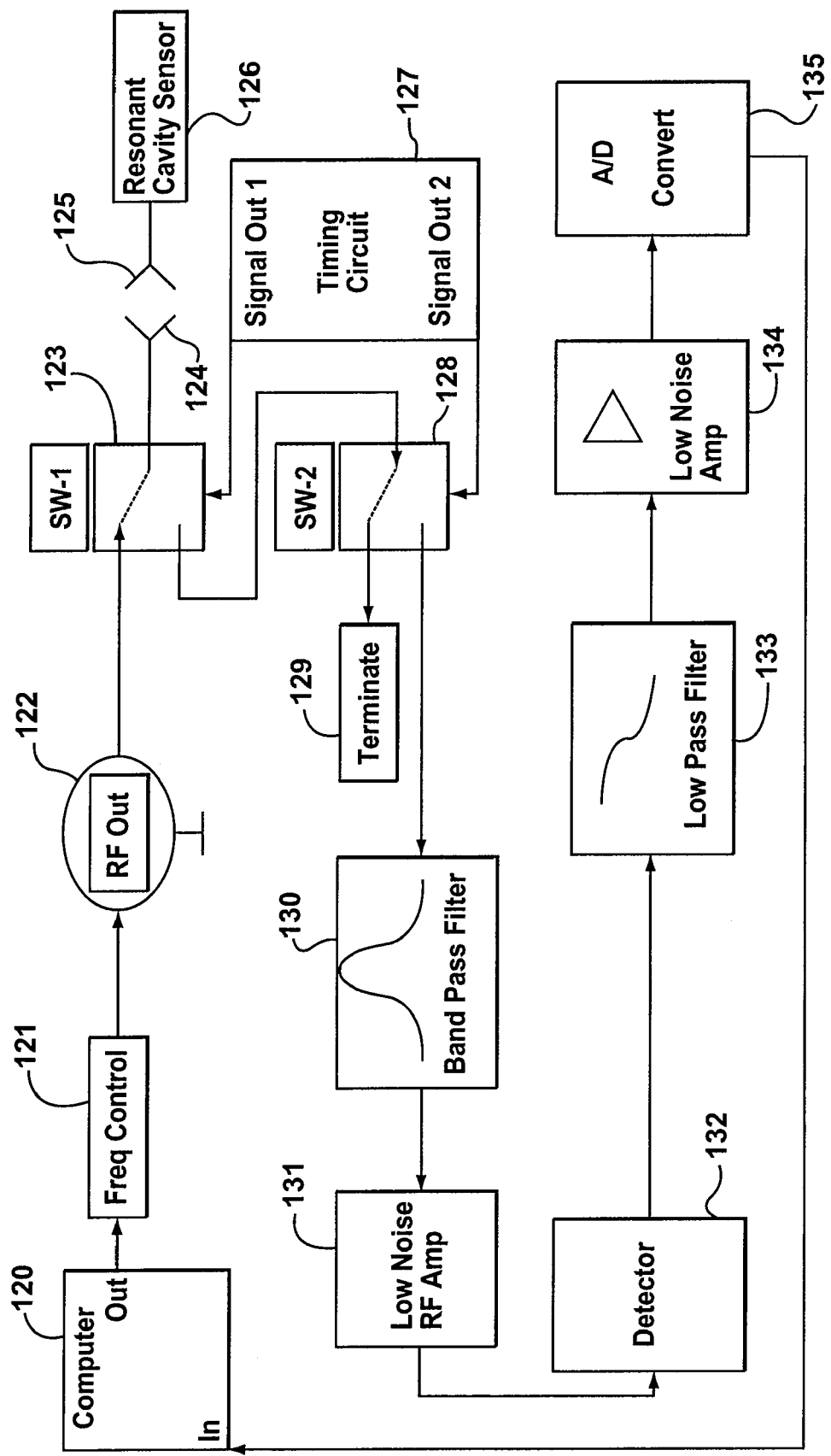
FIG. 12 is the block diagram for one method for interrogating resonant cavity sensors.

FIG. 12 shows a block diagram for a method of interrogating resonate cavity sensors. A computer 120 is used as a user interface and sends signals to the frequency control 121 to begin sweeping the frequency. This in turn controls an RF source 122 to emit an electromagnetic signal at the chosen frequency. If the first switch 123 is in the send mode the RF signal is then transmitted to the antenna 124 and is sent to the sensor antenna 125.

The antenna can be any antenna suitable for transmitting and receiving RF signals. For example, but not limited to, the antennas 124, 125 can be a dipole antenna or a patch antenna. There can also be some embodiments of the interrogator in which there are two antennas wherein the first antenna is used for transmitting the interrogation signal and the second antenna is used to receive the response signal.

The electromagnetic signal is then coupled into the resonant cavity sensors 126 as described above. The electromagnetic signal energy builds up for a period of time, determined approximately by the Q of the resonant cavity. For resonances with Q of 1000 at 2.5 GHz, this is typically 500 nanoseconds. After this time the first switch changes into receive mode and gates any incoming signal towards the second switch 128. A timing circuit 127 provides a delay after turning the first switch 123 into the receive position. This delay allows electromagnetic signals reflecting from interfering sources, such as, for example, but not limited to, walls vehicles, furniture and steel reinforcing, to be dumped into the termination 129, where they will not interfere with the signal of interest. After a suitable length of time, typically 10 to 100 nanoseconds, the second switch 128 is moved into a position where it passes the signal through to the bandpass filter 130. The bandpass filter acts to eliminate interference from sources such as pagers and cell phones. The signal then proceeds to a low noise amplifier 131 that boosts the signal level. The signal is then coupled to the detector 132 that converts the RF power into a voltage signal. The low frequency signal from the detector 132 is then filtered to eliminate unwanted high frequency signals using a lowpass filter 133. A low noise amplifier 134 amplifies the signal to levels suitable for the analog to digital converter (A/D) 135 and this digital signal is fed back to the computer 120. By sweeping through a range of frequencies a graph of sensor signal versus frequency can be obtained. From this graph the resonant frequencies of the sensors can be found using many algorithms, such as peak fitting, matched filtering, centroid determination or maximum value determination. To measure a parameter of interest, the resonant frequency is measured at some point in time to provide a reference. At some later time the resonant frequency is again measured and the parameter of interest can then be estimated. For example, if strain is the parameter of interest it can be estimated using formula 7.

The detection module 132 can be implemented in a number of ways depending on which method is used for the determination of the resonant frequency of the electromagnetic cavity. In all cases, the detection module 132 would process the response signal to reduce the amount of noise in the response signal and to translate the frequency content of the response signal to another frequency band for more efficient signal processing as is commonly known to those skilled in signal processing. For instance, the detection module 132 can include a bandpass filter for removing noise from the response signal as well as a mixer to demodulate the response signal to an intermediate frequency or to the baseband for analysis. If the interrogator is implemented using a digital signal processor or another embedded processor then down sampling can also be performed to reduce the amount of data that is recorded.

When a narrowband signal is used for the interrogation signal, the detection module 132 can be an envelope detector that is used to detect the magnitude of the response signal. The envelope detector can be a diode detector or a peak detector as is commonly known to those skilled in the art.

Alternatively, if a broadband signal is used for the interrogation signal, the detection module 132 can incorporate frequency analysis to analyze the measured response signal across frequency to determine the resonant frequency. In this case, the detection module 132 can include a bank of correlators or a filter bank, which are each associated with a frequency, and locate which correlator or filter has the smallest output to determine the minimum. Alternatively, the detection module 132 can incorporate an FFT module (which can be implemented in hardware or software if a microprocessor or DSP is used to implement the interrogator) to perform a frequency analysis of the measured response signal. Time averaging would reduce the magnitude of the noise in the response signal provided that the time lag for each response signal is similar.

In use, a structural inspector can carry the interrogator to various locations in or on the structure where the sensors are located. The structural inspector would then point the interrogator towards the sensors and push a button to generate and transmit the interrogation signal to the sensors. The interrogator would then detect the resonant frequencies of the sensors and calculate the parameter of interest at that portion of the structure. The interrogator could be any distance away from the sensors as long as the interrogation signal is strong enough to excite the electromagnetic cavity and the response signal is strong enough so that the interrogator can determine the resonant frequency.

The electromagnetic cavity of the sensors can be built to handle relatively large amounts of power. Furthermore, the sensors have simple and rugged construction and are passive embedded sensors that can be wirelessly interrogated thereby eliminating the need for a power source and any permanent electrical or optical connections that are subject to breaking, becoming dislodged or damaged by vandals.

The sensor system is also very portable and easy to install. Anyone on the job site can install the sensors during the time of construction of the structure. The sensors would be placed at locations where the parameter of interest is to be measured. The sensors can be embedded in a concrete structure while the concrete is still wet. For instance, the sensor can be covered by approximately 20 cm of concrete. Alternatively, the sensors can be attached to the reinforcing bars of the structure. The embedded sensors also do not jeopardize the soundness of the structure.

The sensors can also be attached to steel and wooden structures after the structures have been completed.

There are a variety of uses for the sensor system of the applicants' teachings. For instance, the sensor system could be used for the testing of the structure in response to a test loads. The sensor systems could be used to monitor a number of parameters important to the evaluation of structures. This would include the moisture content of concrete, the pH of concrete and the temperature within the concrete. This would allow standardized testing of structures and the more accurate determination of their health and safety.

Alternatively, the sensor system could be used to assess damage in civil structures. For instance, after the occurrence of a natural disaster such as an earthquake, the sensor system can be used to determine the health of structures to determine whether it is safe for emergency personnel to enter the structure. The changes in important parameters could be measured over time to determine whether the structure will fail and how long it would take for this failure to occur.

Applicants' teachings can also be used to evaluate the performance and health of civil structures. For example, as a bridge is constructed several of the sensors would be embedded at strategic sites. When construction of the bridge was complete each of these sensors would be interrogated to determine if the bridge meets its specifications and to establish a baseline reading. After this baseline was established the embedded sensors would be periodically interrogated to determine the health or level of deterioration of the structure.

Although the examples and various embodiments described above illustrate that the body of the sensor has an electromagnetic cavity, it should be understood by those skilled in the art that the sensor has a body that is capable of supporting resonant electromagnetic modes. Furthermore, the electromagnetic cavity can be considered, in general, to be an electromagnetic resonator that resonates at a frequency related to the dimensions of the electromagnetic resonator. For instance, the electromagnetic resonator can also be a dielectric body within an insulating material to form a dielectric resonator. In this case the coupler 16 would not require the wire.

Furthermore, it should be understood that various modifications could be made to the various embodiments described and illustrated herein, without departing from the applicants' teachings, the scope of which is defined in the appended claims. For instance, a similar sensor system can be developed to monitor the structural integrity of vehicles. In this case, the frequency range would likely need to be increased to produce smaller sensors.

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

We claim:

1. A method for measuring parameters experienced by a structure, the method comprising:
   a) coupling at least one sensor to the structure, the at least one sensor having at least one electromagnetic resonator;
   b) transferring an interrogation signal wirelessly from a first antenna to at least one coupler, through the at least one coupler, and into the electromagnetic resonator to measure a select parameter and to evoke a first response signal associated with the select parameter;
   c) transferring the response signal out of the electromagnetic resonator, through the same or a different coupler, and wirelessly to the first antenna;
   d) measuring at least a second select parameter with the interrogation signal and to evoke at least a second response signal associated with the at least second select parameter; and
   e) transferring the at least second response signal out of the electromagnetic resonator, through the same or a different coupler, and wirelessly to the first antenna.

2. The method of claim 1, wherein the interrogation signal is swept through a range of frequencies.

3. The method of claim 2, wherein the interrogation signal excites at least two electromagnetic resonances that are substantially separated from one another.

4. The method of claim 3, wherein the at least one sensor is a plurality of sensors coupled to the structure, each of the sensors has an associated coupler coupled to it's respective electromagnetic resonator, the associated couplers extend from their respective sensors to a common second antenna.

5. The method of claim 4, wherein each sensor measures a different select parameter.

6. The method of claim 3, wherein the sensor has a plurality of electromagnetic resonators, each of the electromagnetic resonators has an associated coupler coupled thereto, the associated couplers extend from their respective electromagnetic resonators to a common second antenna.

7. The method of claim 6, wherein each electromagnetic measures a different select parameter.

8. The method of claim 3, wherein the electromagnetic resonator of the sensor has at least two rods therewithin, each rod to form within the electromagnetic resonator a resonator system, so that the resonator system associated with a first rod has a resonant frequency substantially separated from the resonant frequency of a second resonator system associated with a second rod.

9. The method of claim 8, wherein each resonator system measures a different select parameter.

10. The method of claim 9, wherein the resonant frequency of a select resonant system can be modified by adding material to the select resonant system within the electromagnetic resonator.

11. The method of claim 9, wherein the resonant frequency of a select resonant system can be modified by coupling the select resonant system within the electromagnetic resonator to a separate cavity.

12. The method of claim 11, wherein the separate cavity contains an electromagnetic material that responds to a select parameter.

13. The method of claim 3, wherein the electromagnetic resonator is rectangular in shape and configuration having dimensions a, b and c, and at least two couplers are coupled to the electromagnetic resonator.

14. The method of claim 13, wherein there are two couplers provided for when a is not equal to b.

15. The method of claim 14, wherein there are three couplers provided for when a is not equal to b and b is not equal to c.

16. The method of claim 15, wherein the three couplers excite orthogonal electromagnetic modes to one another.

17. The method of claim 3, wherein the electromagnetic resonator is an elliptical cavity in shape and configuration having at least dimensions a, and b, where a is not equal to b, and two couplers are coupled to the electromagnetic resonator.

18. A sensor for measuring parameters experienced by a structure, the sensor comprising:
   a) a body having an electromagnetic resonator for producing a wireless response signal in response to a wireless interrogation signal, the body being coupled to the structure to allow a selected parameter to alter the resonance properties of the electromagnetic resonator thereby altering the wireless response signal; and,
   b) at least two couplers coupled to the sensor, the couplers adapted to transfer the wireless interrogation signal from a first antenna into the electromagnetic resonator to measure separate select parameters, and to transfer the respective wireless response signals of the select parameters measured out of the electromagnetic cavity to the first antenna.

19. The sensor of claim 18, wherein the interrogation signal is swept through a range of frequencies.

20. The sensor of claim 19, wherein the electromagnetic resonator is configured so that the interrogation signal excites at least two electromagnetic resonances substantially separated from one another.

21. The sensor of claim 20, wherein the sensor has a plurality of electromagnetic resonators, each of the electromagnetic resonators to measure a different select parameter, each of the electromagnetic resonators has an associated coupler coupled thereto, the associated couplers extend from their respective electromagnetic resonators to a common second antenna.

22. The sensor of claim 21, wherein the plurality of electromagnetic resonators are separated by a barrier.

23. The sensor of claim 20, wherein the electromagnetic resonator of the sensor has at least two rods therewithin, each rod to form within the electromagnetic resonator a resonator system, so that the resonator system associated with a first rod has a resonant frequency substantially separated from the resonant frequency of a second resonator system associated with a second rod.

24. The sensor of claim 23, wherein each resonator system measures a different select parameter.

25. The sensor of claim 24, further comprising material added to a select resonant system within the electromagnetic resonator so that the resonant frequency of the select resonant system is modified.

26. The sensor of claim 24, further comprising a separate cavity coupled to a select resonant system within the electromagnetic resonator so that the resonant frequency of the select resonant system is modified.

27. The sensor of claim 26, wherein the separate cavity contains an electromagnetic material that responds to a select parameter.

28. The sensor of claim 20, wherein the electromagnetic resonator is rectangular in shape and configuration having dimensions a, b and c, and at least a is not equal to b.

29. The sensor of claim 28, wherein there are three couplers provided for when a is not equal to b and b is not equal to c.

30. The sensor of claim 29, wherein the three couplers excite electromagnetic resonances that are orthogonal to one another.

31. The sensor of claim 20, wherein the electromagnetic resonator is an elliptical cavity in shape and configuration having at least dimensions a, and b, and a is not equal to b.

32. A sensor for measuring parameters experienced by a structure, the sensor comprising:
   a) a body having an electromagnetic resonator for producing a wireless response signal in response to a wireless interrogation signal, the body being coupled to the structure to allow a selected parameter to alter the resonance properties of the electromagnetic resonator thereby altering the response signal, the electromagnetic resonator of the sensor having at least two rods therewithin, each rod to form within the electromagnetic resonator a resonator system, so that the resonator system associated with a first rod has a resonant frequency substantially separated from the resonant frequency of a second resonator system associated with a second rod; and,
   b) a coupler coupled to the sensor, the coupler adapted to transfer the wireless interrogation signal from an antenna into the electromagnetic resonator to measure separate select parameters, and to transfer the respective wireless response signals of the select parameters measured out of the electromagnetic cavity to the same or a different antenna.

33. The sensor of claim 32, wherein each resonator system measures a different select parameter.

34. The sensor of claim 32, further comprising material added to a select resonant system within the electromagnetic resonator so that the resonant frequency of the select resonant system is modified.

35. The sensor of claim 32, further comprising a separate cavity coupled to a select resonant system within the electromagnetic resonator so that the resonant frequency of the select resonant system is modified.

36. The sensor of claim 35, wherein the separate cavity contains an electromagnetic material that responds to a select parameter.

* * * * *